(12) United States Patent
Wakamatsu (10) Patent No.: US 8,570,974 B2
(45) Date of Patent: Oct. 29, 2013

(54) COMMUNICATION APPARATUS, TRANSMISSION SCHEME SETTING METHOD, PROGRAM, AND RADIO COMMUNICATION SYSTEM

(75) Inventor: Masataka Wakamatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 942 days.

(21) Appl. No.: 12/297,713

(22) PCT Filed: Apr. 16, 2007

(86) PCT No.: PCT/JP2007/058264
§ 371 (c)(1),
(2), (4) Date: Mar. 2, 2009

(87) PCT Pub. No.: WO2007/123079
PCT Pub. Date: Nov. 1, 2007

(65) Prior Publication Data
US 2009/0310497 A1 Dec. 17, 2009

(30) Foreign Application Priority Data
Apr. 20, 2006 (JP) ................................ 2006-116393

(51) Int. Cl.
*H04W 72/00* (2009.01)
(52) U.S. Cl.
USPC ......... 370/330; 370/332; 370/252; 455/452.2
(58) Field of Classification Search
USPC ............... 370/232, 321, 442, 330; 455/452.2
See application file for complete search history.

(56) References Cited

U.S. PATENT DOCUMENTS

| | | | |
|---|---|---|---|
| 7,110,380 B2 * | 9/2006 | Shvodian | 370/336 |
| 7,171,169 B2 | 1/2007 | Habetha | |
| 7,184,448 B2 | 2/2007 | Moon et al. | |
| 7,672,365 B2 * | 3/2010 | Jacobsen et al. | 375/221 |
| 2002/0136196 A1 * | 9/2002 | Moon et al. | 370/347 |
| 2002/0159434 A1 * | 10/2002 | Gosior et al. | 370/350 |
| 2002/0183010 A1 * | 12/2002 | Catreux et al. | 455/67.1 |
| 2004/0022176 A1 | 2/2004 | Hashimoto et al. | |

FOREIGN PATENT DOCUMENTS

| | | |
|---|---|---|
| JP | 7-250116 | 9/1995 |
| JP | 09-289500 | 11/1997 |
| JP | 2002-290362 | 10/2002 |
| JP | 2003-32745 | 1/2003 |
| JP | 2003-032745 | 1/2003 |
| JP | 2004-519894 | 7/2004 |

* cited by examiner

*Primary Examiner* — Mark Rinehart
*Assistant Examiner* — Matthew Hopkins
(74) *Attorney, Agent, or Firm* — Finnegan, Henderson, Farabow, Garrett & Dunner, L.L.P.

(57) ABSTRACT

[Object] To ensure a maximum data transfer rate to achieve an improvement in throughput. [Solving Means] A CPU 114 determines whether or not time-dependent interference is present during communication with a communication partner. When it is determined that time-dependent interference is present, a PHY mode to be used in each zone is determined for each communication partner on the basis of transmission line state information or packet error detection information received via a CPU I/F register 113, and is set in a PHY mode table 115 through a CPU bus. A selector 116 selects a PHY mode to be used during the current transmission from the PHY mode table 115 on the basis of a destination ID of a communication partner and zone information (count value of a TimeZone counter 110) involved in next sending or reception, and sets the PHY mode in a packet composition/decomposition processing unit 118.

12 Claims, 12 Drawing Sheets

| PHY CHANNEL NUMBER | FREQUENCY HOPPING SUB-BAND ID | | | | | |
|---|---|---|---|---|---|---|
| TFC: 1 | Sub Band 1 | Sub Band 2 | Sub Band 3 | Sub Band 1 | Sub Band 2 | Sub Band 3 |
| TFC: 2 | Sub Band 1 | Sub Band 3 | Sub Band 2 | Sub Band 1 | Sub Band 3 | Sub Band 2 |
| TFC: 3 | Sub Band 1 | Sub Band 1 | Sub Band 2 | Sub Band 2 | Sub Band 3 | Sub Band 3 |
| TFC: 4 | Sub Band 1 | Sub Band 1 | Sub Band 3 | Sub Band 3 | Sub Band 2 | Sub Band 2 |
| TFC: 5 | Sub Band 1 | Sub Band 1 | Sub Band 1 | Sub Band 1 | Sub Band 1 | Sub Band 1 |
| TFC: 6 | Sub Band 2 | Sub Band 2 | Sub Band 2 | Sub Band 2 | Sub Band 2 | Sub Band 2 |
| TFC: 7 | Sub Band 3 | Sub Band 3 | Sub Band 3 | Sub Band 3 | Sub Band 3 | Sub Band 3 |

FIG. 9

| Data Rate (Mb/s) | Modulation | Coding Rate (R) | FDS | TDS | Coded Bits/ 6 OFDM Symbol ($N_{CBP6S}$) | Info Bits/ 6 OFDM Symbol ($N_{IBP6S}$) |
|---|---|---|---|---|---|---|
| 53.3 | QPSK | 1/3 | YES | YES | 300 | 100 |
| 80 | QPSK | 1/2 | YES | YES | 300 | 150 |
| 106.7 | QPSK | 1/3 | NO | YES | 600 | 200 |
| 160 | QPSK | 1/2 | NO | YES | 600 | 300 |
| 200 | QPSK | 5/8 | NO | YES | 600 | 375 |
| 320 | DCM | 1/2 | NO | NO | 1200 | 600 |
| 400 | DCM | 5/8 | NO | NO | 1200 | 750 |
| 480 | DCM | 3/4 | NO | NO | 1200 | 900 |

COMMUNICATION APPARATUS, TRANSMISSION SCHEME SETTING METHOD, PROGRAM, AND RADIO COMMUNICATION SYSTEM

TECHNICAL FIELD

This invention relates to a communication apparatus that performs radio communication with another communication apparatus using a frame structure, a transmission scheme setting method, a program, and a radio communication system. More specifically, this invention relates to a communication apparatus, etc., that are adapted to monitor a communication state in each of a plurality of time regions obtained by dividing a frame period and to set a transmission scheme to be used in each of the plurality of time regions on the basis of a result of the monitoring to thereby ensure a maximum data transfer rate to achieve an improvement in throughput.

BACKGROUND ART

In a wireless LAN (Local Area Network) or a wireless PAN (Personal Area Network) using UWB (Ultra Wide Band), a plurality of PHY modes are defined, and an optimum PHY mode is selected according to the current communication quality (transmission line status) to perform control so as to generally provide a packet error rate of 10% or less (in general, referred to as an "adaptive modulation scheme" or the like).

For example, in IEEE 802.11a, eight PHY modes of 6 Mbps to 54 Mbps are defined. Further, in a WiMedia PHY MB-OFDM (Multi Band-Orthogonal Frequency Division Multiplexing) scheme, which is a UWB scheme used for Wireless USB (Universal Serial Bus), eight PHY modes of 53.3 Mbps to 480 Mbps are defined. In such a system in which a plurality of PHY modes are defined, a method of selecting an optimum PHY mode according to the communication quality has hitherto been proposed.

Hitherto, in a case where an adaptive modulation scheme is performed, a method has been adopted in which a pilot signal is monitored to estimate a state of a transmission line (see Patent Document 1) or in which a packet error rate or packet arrival delay with respect to a certain number of packets to be sent is monitored and is improved by switching a PHY mode to that of a one step lower rate in a case where the error rate or delay exceeds a predetermined value (see Patent Document 2).

In connection to this, substantially no consideration has been given regarding which method to use to monitor a transmission line state or packet error rate, and a method has merely been examined in which in order to reduce variations in monitoring operations, the number of monitoring operations is increased to some extent to increase the average number. If packet errors were caused by a time-independent interference signal or gauss noise, adaptive modulation based on this monitoring method would be performed without difficulty. In a case where time-dependent interference exists, however, a problem occurs.

For example, in an MB-OFDM scheme adopted in WUSB (Wireless USB), time-dependent interference exists. A description of this interference will be first given followed by what problem occurs if an adaptive modulation scheme using a method of the related art is applied under the existence of time-dependent interference.

Figure 6:
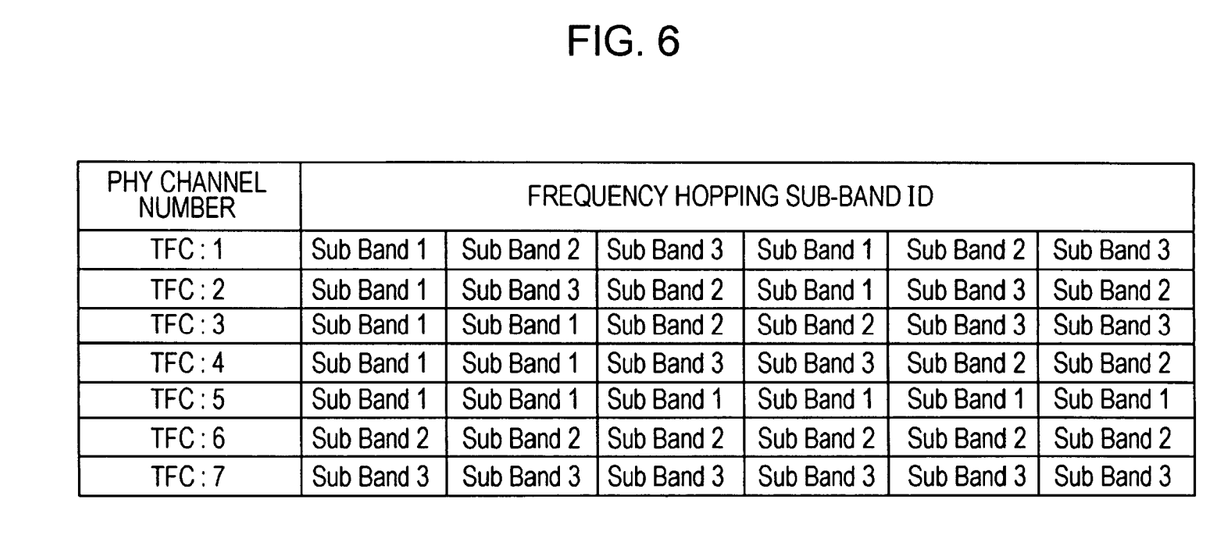
FIG. 6 is a diagram showing channels of a WiMedia PHY MB-OFDM scheme.

In a WiMedia PHY MB-OFDM scheme, as in FIG. 6, seven "channels" are defined. In this regard, a "channel" in the eMB-OFDM scheme does not refer to a standard frequency channel but is used to mean that hopping patterns are different within an identical frequency band. That is, even different channels would interfere with each other.

Figure 7:
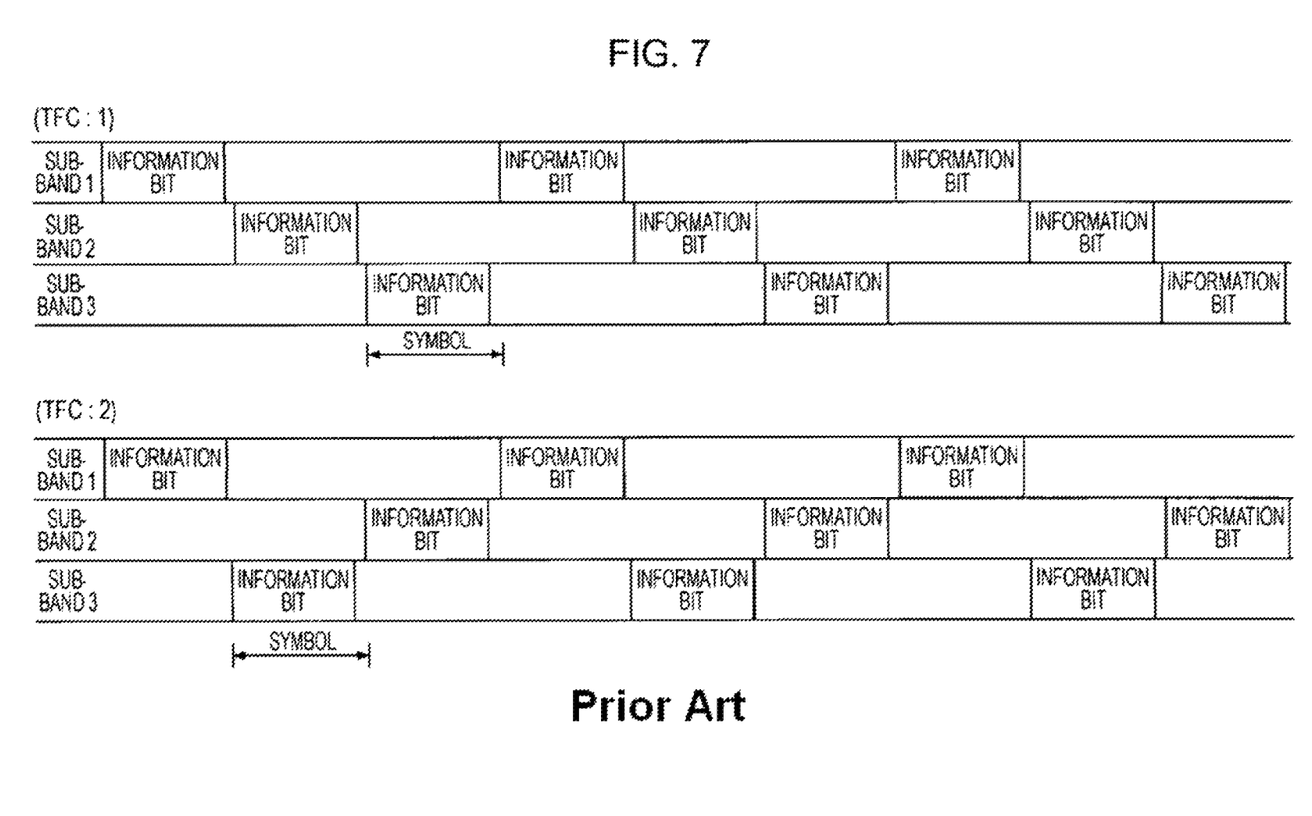
FIG. 7 is a diagram showing, by comparison, frequency hopping patterns of channel 1 (TFC:1) and channel 2 (TFC:2).
Figure 8:
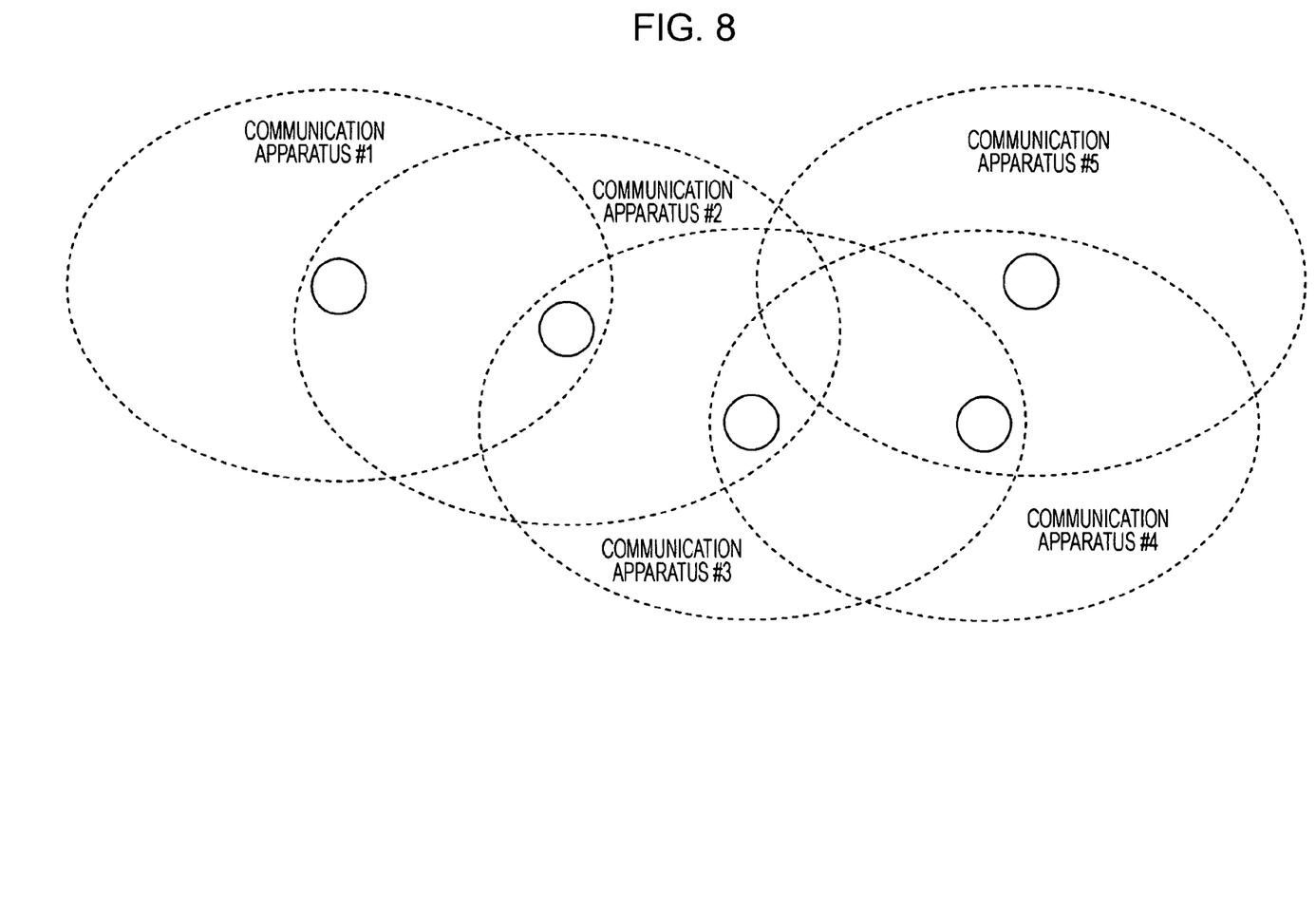
FIG. 8 is a diagram showing an example structure of a network.

As shown in FIG. 7, focusing on a channel of TFC:1 and a channel of TFC:2 as an example, signal collision occurs in a sub-band 1 (Subband 1) once every three symbols. For example, in FIG. 8, in a case where communication apparatuses #1 and #2 communicate with each other over TFC:1 and communication apparatuses #3 and #4 communicate with each other over TFC:2, the above collision occurs in the communication apparatus #2. Depending on the positional relationship between communication apparatuses or the transmission power, in a case where radio waves that reach the communication apparatus #2 from the communication apparatuses #1 and #3 have substantially the same signal intensity, the communication apparatus #2 is prevented from correctly receiving signals of Subband 1.

Figure 9:
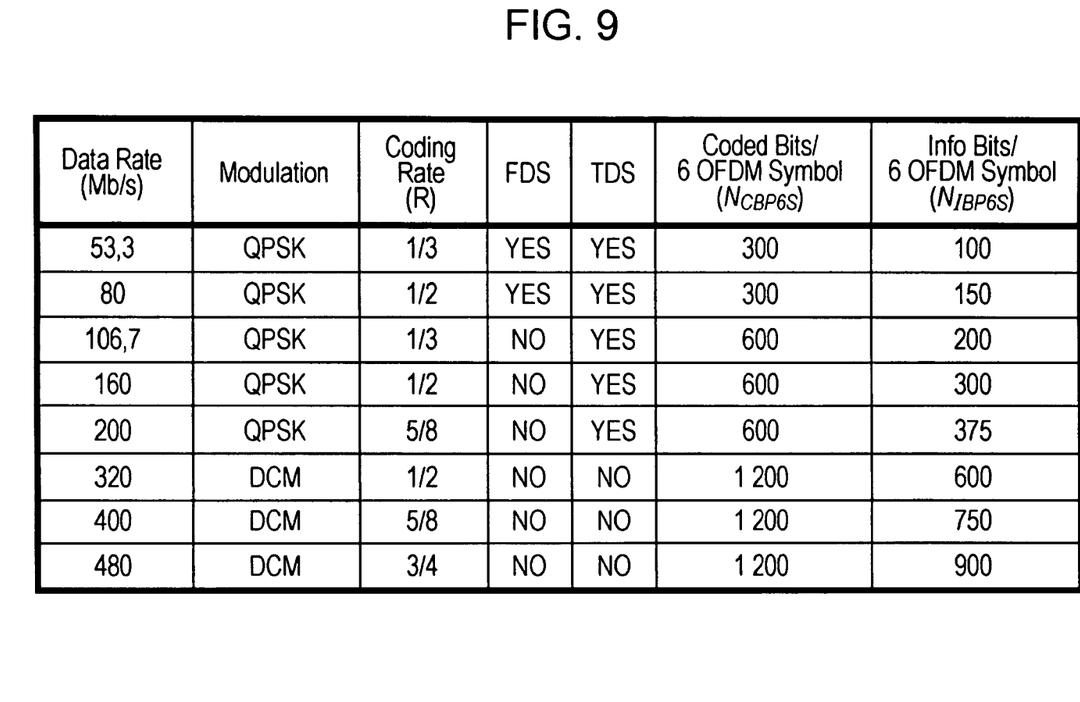
FIG. 9 is a diagram showing eight PHY modes of the MB-OFDM scheme.

In the MB-OFDM scheme, as shown in FIG. 9, eight PHY modes exist, where Time Domain Spreading (TDS) is not implemented for the 320 Mbps, 400 Mbps, and 480 Mbps modes and, as described above, incorrect reception on Subband 1 would cause insufficient error correction, resulting in a packet error. On the other hand, Time Domain Spreading is implemented for the modes of 200 Mbps or less, and data having the same content is sent using two consecutive symbols. Thus, incorrect reception at Subband 1 would not cause a packet error if reception at next, Subband 2 can be correctly performed.

Patent Document 1: Japanese Unexamined Patent Application Publication No. 7-250116
Patent Document 2: Japanese Unexamined Patent Application Publication (Translation of PCT Application) No. 2004-519894

DISCLOSURE OF INVENTION

Technical Problem

Figure 10:
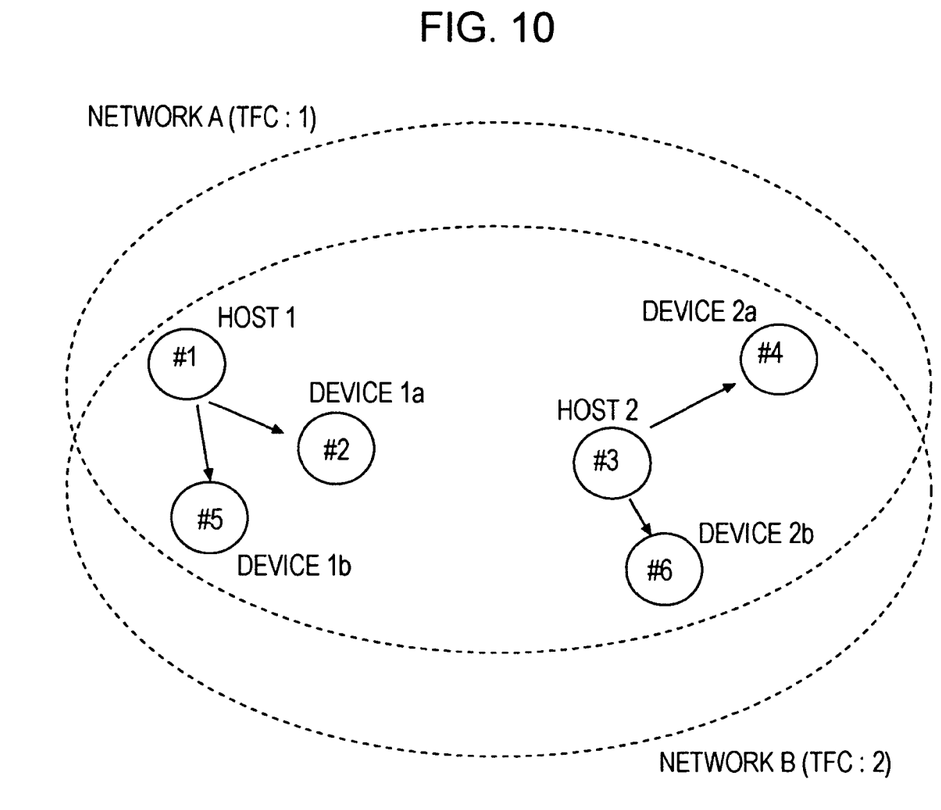
FIG. 10 is a diagram showing an example structure of a WUSB network.

FIG. 10 shows an example structure of a WUSB network. A network 1 uses a channel of, for example, TFC:1 and is composed of a host 1 and devices 1a and 1b as individual communication apparatuses. A network 2 uses a channel of, for example, TFC:2 and is composed of a host 2 and devices 2a and 2b as individual communication apparatuses.

Figure 11:
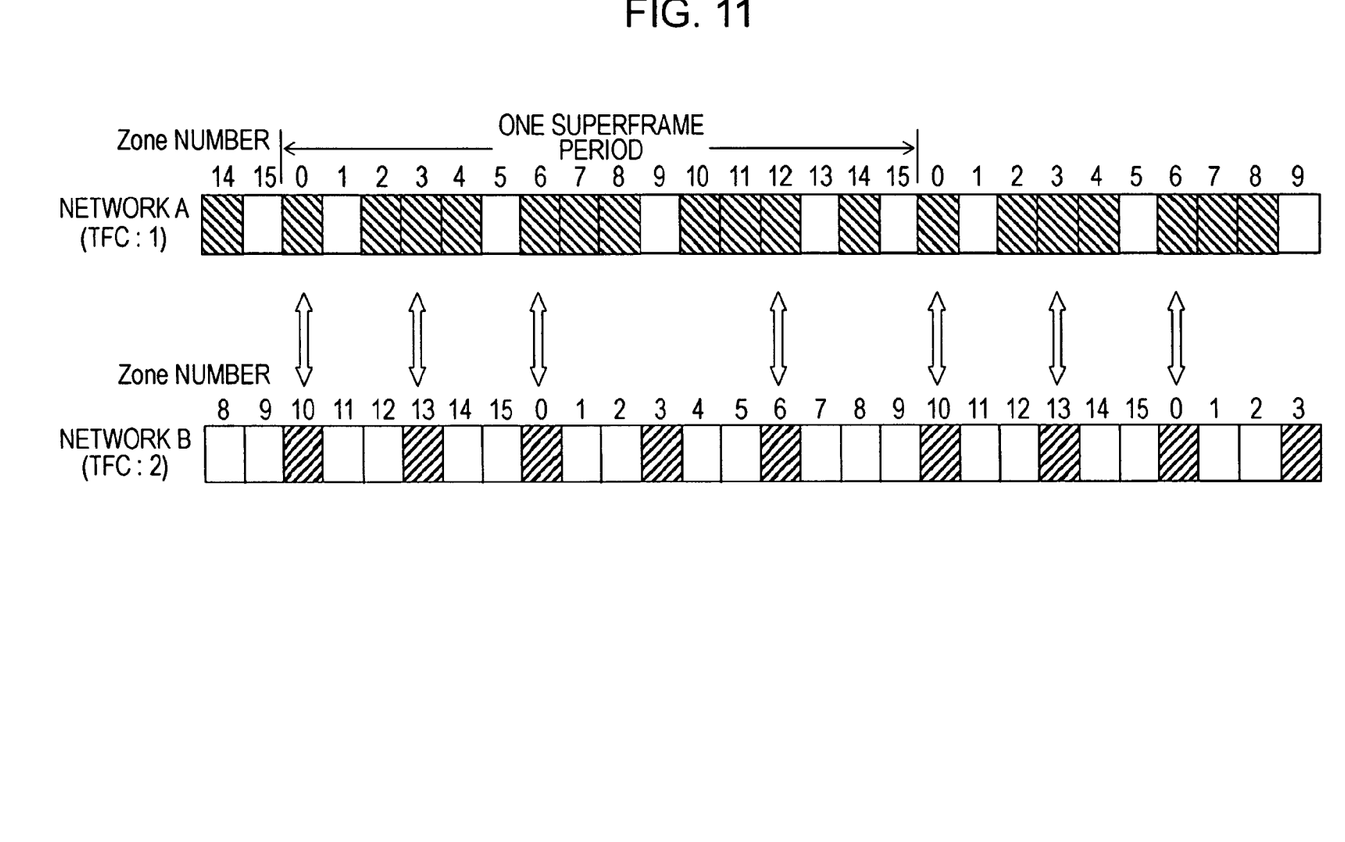
FIG. 11 is a diagram for explaining interference in a case where two networks operate on different channels.
Figure 12:
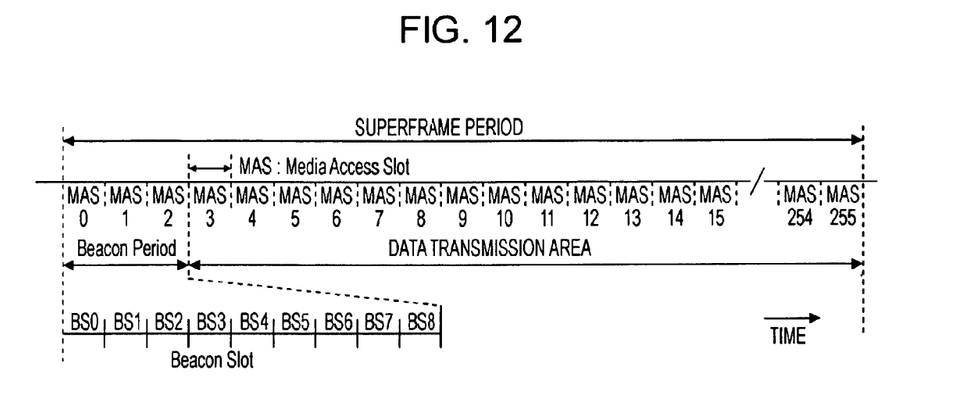
FIG. 12 is a diagram showing an example structure of a superframe.

FIG. 11 shows how to operate along a time axis when, as shown FIG. 10 described above, the WUSB networks A and B are operating on different channels. Note that radio communication over those WUSB networks is performed using a superframe structure. FIG. 12 shows an example structure of a superframe. As shown in the figure, a superframe period is segmented into 256 media access slots (MASs). Further, in a superframe, a Beacon Period as a management area and a data transmission area are arranged. Further, the beacon period is formed of nine Beacon Slots.

Figure 13:
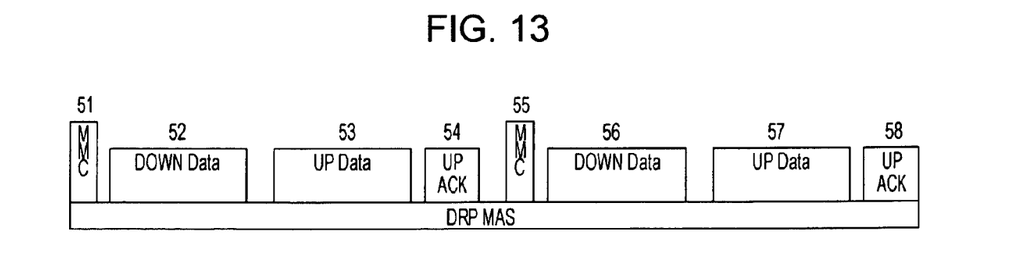
FIG. 13 is a diagram for explaining an example of access control in a DRP MAS.

A data transmission between a host and a device is performed using a MAS reserved by the host according to the DRP (Distributed Reservation Protocol). FIG. 13 shows an example of access control in a DRP MAS. Here, an MMC (Micro-scheduled Management Command), which is a command, is sent from a WUSB host at the beginning of a DRP-reserved area.

In this MMC, information for identifying the host, a start time of down data from the host to a certain device within that MMC period, a start time of up data from the device to the host, and a next MMC sending time are described. That is, once an MMC 51 is received, subsequent down data 52, up data 53, an up ACK 54, and a timing of a next MMC 55 can be set. Likewise, in this structure, once the next MMC 55 is received, subsequent down data 56, up data 57, an up ACK 58, and a timing of a next MMC (not shown in the figure) can be determined.

In FIG. 11, each superframe period is shown to be divided into 16 Zones. As described above, since a superframe period is segmented into 256 MASs, each zone includes 16 MASs. Zone 0 includes a beacon period, and frequent transmission occurs via any network. For the remaining zones, frequent communication occurs in individual zones including DRP-reserved MASs.

And, the signal collision described above occurs in a time region in which Zones where frequent communication occurs via the networks A and B overlap. In FIG. 11, zones where frequent communication occurs via the networks A and B are shown as hatched zones. For the network A, Zones 0, 2 to 4, 6 to 8, 10 to 12, and 14 are zones where frequent communication occurs. For the network B, Zones 0, 3, 6, 10, and 13 are zones where frequent communication occurs.

In this case, as indicated by arrows in FIG. 11, signal collision occurs in four zones. That is, as viewed in the network A, signal collision occurs in Zones 0, 3, 6, and 12 and, as viewed in the network B, signal collision occurs in Zones 0, 6, 10, and 13.

In such a state, if an adaptive modulation scheme based on an existing method of monitoring packet errors with respect to a certain number of packets to be sent is applied, a packet error rate per superframe will be, for example, $4/11 \equiv 0.36$ unless a PHY mode is reduced to that of 200 Mbps or less. As a result, even if a zone where collision does not occur has a range in which communication at 480 MMbps is possible, PHY modes are uniformly set to those of 200 Mbps, and the inherent transmission capacity is not sufficiently utilized.

It is an object of this invention to ensure a maximum data transfer rate to achieve an improvement in throughput.

Technical Solution

A concept of this invention resides in a communication apparatus that performs radio communication with another communication apparatus using a frame structure, characterized by including:

a time region division unit that divides the frame period into a plurality of time regions;

a communication state monitoring unit that monitors a communication state in each of the plurality of time regions obtained by the time region division unit; and a transmission scheme setting unit that sets, based on a monitoring result obtained by the communication state monitoring unit for each of the plurality of time regions, a transmission scheme to be used in each of the plurality of time regions.

In this invention, radio communication with another communication apparatus using a frame structure is performed. A frame period is divided into a plurality of time regions. For example, in the case of WUSB, a frame period is divided by every zone, every MAS, every predetermined number of MASs, or the like. Then, a communication state in the plurality of obtained time regions is monitored. For example, errors of a packet at least to be sent or received are monitored. Alternatively, for example, a transmission line state in communication with another communication apparatus is monitored.

A transmission scheme to be used in each time region is set based on a monitoring result obtained in each of the plurality of time regions. Here, for example, in the case of WUSB, a transmission scheme to be used is selected from eight PHY modes (see FIG. 9). For example, in a situation where errors of a packet are monitored as a communication state to be monitored, a transmission scheme is set according to the error rate of the packet. For example, when the error rate of the packet exceeds a predetermined value in a state where a predetermined transmission scheme is set, a transmission scheme having a lower data transfer rate than the predetermined transmission scheme is set again.

Further, for example, in a situation where a transmission line state with respect to the other communication apparatus is monitored as a communication state to be monitored, a transmission scheme is set according to a transmission line state. For example, when the transmission line state is worse than a predetermined state in a state where a predetermined transmission scheme is set, a transmission scheme having a lower data transfer rate than the predetermined transmission scheme is set again.

In a case where a plurality of other communication apparatuses exist, a communication state may be monitored for each of the other communication apparatuses, and a transmission scheme may be set based on a monitoring result of a communication state for each of the other communication apparatuses. This is because, in a case where a plurality of other communication apparatuses exist, it is generally expected that a communication state differs depending on the position, performance, etc., of the individual communication terminal apparatuses.

Dividing a frame period into a plurality of time regions and monitoring a communication state, as described above, are effective particularly when time-dependent interference is present during communication with another communication apparatus. Therefore, the monitoring of a communication state for each of the individual time regions and the setting of a transmission scheme, described above, may be performed in a case where it is determined that time-dependent interference is present during communication with another communication apparatus.

For example, in a case where radio communication is performed by applying repetitions of a predetermined frequency hopping pattern, reception can be performed by sequentially changing frequency hopping patterns except for the predetermined frequency hopping pattern, and it can be determined that time-dependent interference is present when any communication is received using one of the frequency hopping patterns. Furthermore, for example, when variations of reception quality in each of the plurality of obtained time regions exceed a predetermined range, it can be determined that time-dependent interference is present.

For example, in a case where it is determined that no time-dependent interference is present, a communication state in a predetermined time region out of the plurality of time regions obtained by the time region division unit is monitored, and a transmission scheme to be used in each of the plurality of time regions is set based on a monitoring result obtained in the predetermined time region. This is because, in this case, the monitoring of a communication state for each of the individual time regions and the setting of a transmission scheme are considered meaningless because no time-dependent interference is present.

As described above, based on a monitoring result of a communication state in each of a plurality of time regions obtained by dividing a frame period, a transmission scheme to be used in each of the time regions is set, whereby transmission schemes with the highest data transfer efficiency can be set for individual time regions. Therefore, a maximum data transfer rate can be ensured in radio communication with another communication apparatus to achieve an improvement in throughput.

Advantageous Effects

According to this invention, it is designed to monitor a communication state in each of a plurality of time regions obtained by dividing a frame period and to set, based on a result of the monitoring, a transmission scheme to be used in each of the plurality of time regions. A maximum data transfer rate can be ensured to achieve an improvement in throughput.

EXPLANATION OF REFERENCE NUMERALS 100 communication apparatus, 110 Time Zone counter, 111 transmission line monitoring unit, 112 packet error detection unit, 113 CPU I/F register, 114 CPU, 115 PHY mode table, 116 selector, 117 PHY signal processing unit, 118 packet composition/decomposition processing unit

BEST MODE FOR CARRYING OUT THE INVENTION

Figure 1:
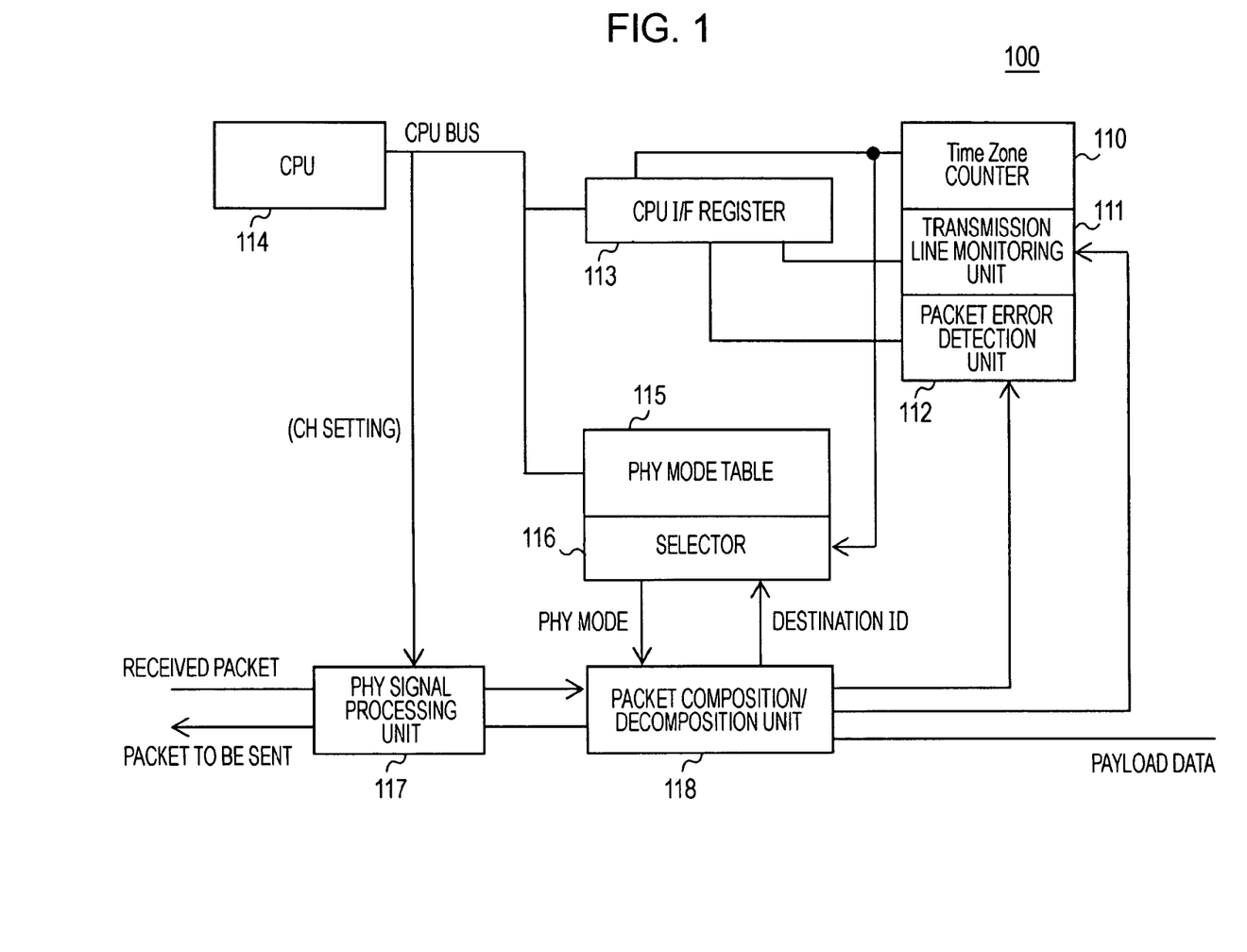
FIG. 1 is a block diagram showing a structure of a communication apparatus used as a WUSB host as an embodiment.

An embodiment of this invention will be described hereinafter with reference to the drawings. FIG. 1 shows a structure of a communication apparatus 100 used as a WUSB host as an embodiment.

The communication apparatus 100 has a TimeZone counter 110, a transmission line monitoring unit 111, a packet error detection unit 112, a CPU I/F register 113, a CPU 114, a PHY mode table 115, a selector 116, a PHY signal processing unit 117, and a packet composition/decomposition processing unit 118.

The TimeZone counter 110 generates a count value for dividing each superframe period (see FIG. 12) by every Zone. The TimeZone counter 110 is composed of a hexadecimal counter (4-bit counter), and is reset to 0 at the beginning of Zone 0 and then incremented every time a zone begins. The TimeZone counter 110 constitutes a time region division unit.

The transmission line monitoring unit 111 monitors the state of a transmission line with respect to another communication apparatus (communication partner) as a device. The PHY signal processing unit 117 evaluates reception quality LQI at the time of receipt of a packet, and attaches the reception quality LQI to the received packet. The transmission line monitoring unit 111 can monitor the state of the transmission line using, for example, such reception quality LQI attached to the received packet.

The packet error detection unit 112 detects errors of a packet to be sent to and received from the communication partner. Here, one of a received packet and a packet to be sent or both are used. A packet has added thereto a CRC code called FCS for determining whether or not the packet has been correctly received. The packet error detection unit 112 can check the FCS to detect an error of a received packet. The packet error detection unit 112 can also detect an error of a packet to be sent on the basis of an up ACK (see FIG. 13) forwarded from the communication partner. The transmission line monitoring unit 111 and the packet error detection unit 112 each constitute a communication state monitoring unit.

The CPU I/F register 113 passes transmission line state information obtained by the transmission line monitoring unit 111 and packet error detection information obtained by the packet error detection unit 112, together with a tag (count value of the TimeZone counter 110) indicating a zone (time region), to the CPU 114.

In this manner, a tag indicating a zone is added to transmission line state information and packet error detection information, whereby it can easily be identified with which zone such information is associated when the CPU 114 reads the information later. In a case where a plurality of communication partners are present, a destination ID for specifying a communication partner is further added to such information. This enables, for each of the individual communication partners, management based on division into time regions.

The CPU 114 performs processing such as setting a channel at the PHY signal processing unit 117 and setting a PHY mode (transmission scheme) to be used in each zone. The PHY mode table 115 stores PHY modes to be used in individual zones. In this case, in a case where a plurality of communication partners exist, a PHY mode to be used for each of the individual communication partners is stored.

The selector 116 selects a PHY mode to be used for the current zone and communication partner from the PHY mode table 115 on the basis of the count value obtained by the TimeZone counter 110 and a destination ID for specifying the communication partner, which is obtained by the packet composition/decomposition processing unit 118, and sets the PHY mode in the packet composition/decomposition processing unit 118.

The PHY signal processing unit 117 performs PHY layer signal processing, that is, modulation/demodulation processing, frequency shift processing, and error correction processing. The packet composition/decomposition processing unit 118 receives the set PHY mode information to generate a packet header, and combines the header with a data payload to compose a packet to send. The packet composition/decomposition processing unit 118 also decomposes a received packet to extract header information and data payload information.

A portion of the operation involved in setting a PHY mode, which is performed by the communication apparatus 100 shown in FIG. 1, will be described.

The CPU 114 determines whether or not time-dependent interference is present during communication with a communication partner. As described above, WUSB communication is performed using a predetermined channel selected from, for example, seven channels (see FIG. 6). In this case, it is defined that each channel has a different frequency hopping pattern. For example, a frequency hopping pattern is changed sequentially to frequency hopping patterns of the individual channels (except for a channel being used by myself) to perform reception, and it is determined whether or not predetermined communication has been received using one of the frequency hopping patterns to determine the presence or absence of interference. Alternatively, for example, it is determined whether or not variations of the reception quality LQI in each of the individual zones exceed a predetermined range to determine the presence or absence of interference.

If it is determined that no time-dependent interference is present, the CPU 114 sets a PHY mode without distinguishing between zones. Or, if it is determined that time-dependent interference is present, the CPU 114 sets PHY modes for individual zones. The CPU 114 determines a PHY mode to be used in each zone for every communication partner on the basis of the transmission line state information and packet error detection information received through the CPU I/F register 113, and sets the PHY mode in the PHY mode table 115 via a CPU bus.

The selector 116 selects a PHY mode to be used during the current transmission from the PHY mode table 115 on the basis of a destination ID of a communication partner and zone information (count value of the TimeZone counter 110) involved in next sending or reception, and sets the PHY mode in the packet composition/decomposition processing unit 118. In the case of sending, a selected PHY mode is set in a parameter to be sent, and in the case of reception (sending at the device side), the PHY mode is set in a PHY mode of a $W_{DT}$CTA.

Figure 2:
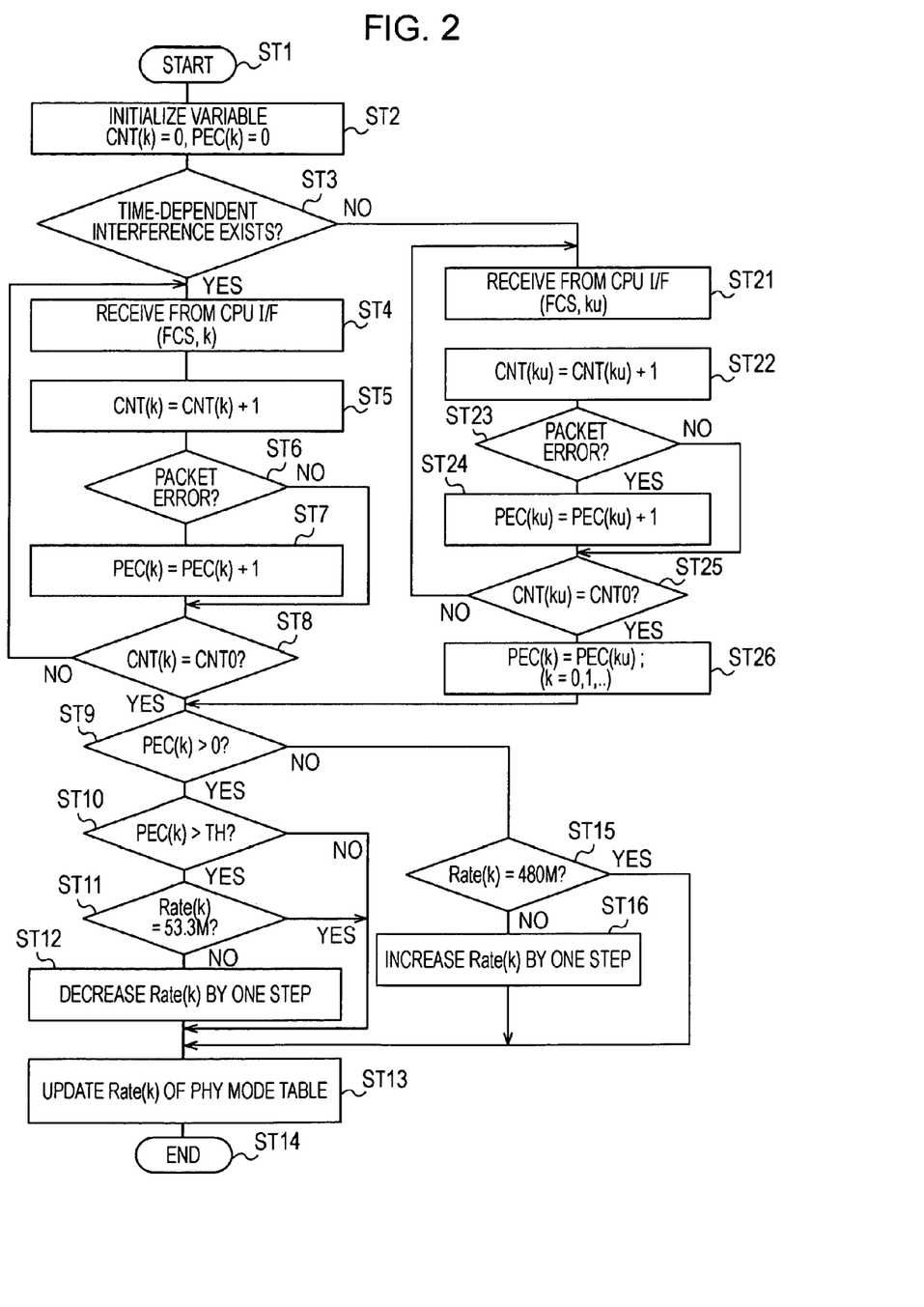
FIG. 2 is a flowchart for explaining a PHY mode setting process, which is performed by a CPU.

A procedure of a process of determining a PHY mode, which is performed by the CPU 114, will be described with reference to a flowchart shown in FIG. 2. Desirably, the CPU 114 executes the flow shown in FIG. 2 at predetermined time intervals, for example, every second, as well as the time of switching of a PHY mode because the state of interference to communication changes with time (a drift or a change in the communication state of both parties).

First, in step ST1, the CPU 114 starts the process and, in step ST2, the CPU 114 performs initialization of each variable. That is, the CPU 114 sets CNT(k)=0 and PEC(k)=0. Here, CNT(k) represents the count number of sent and received packets in a zone k, and PEC(k) represents the count number of packet errors in the zone k.

Then, in step ST3, the CPU 114 determines whether or not time-dependent interference is present. A procedure of this determination process will be described below. When time-dependent interference is present, in step ST4, the CPU 114 receives packet error detection information FCS concerning the zone k from the CPU I/F register 113. In step ST5, the CPU 114 increases the count number of sent and received packets by only one. Here, FCS=1 indicates the presence of a packet error, and FCS=0 indicates no packet error.

Then, in step ST6, the CPU 114 determines whether or not a packet error exists on the basis of the packet error detection information FCS received in step ST4. When a packet error exists, in step ST7, the CPU 114 increases the count number PEC(k) of packet errors by only one, and then proceeds to step ST8. When no packet errors exist, on the other hand, the CPU 114 immediately proceeds to step ST8.

In step ST8, the CPU 114 determines whether or not the count number CNT(k) of sent and received packets in the zone k has reached a packet count number CNT0, for example, 100, which triggers the resetting of packet error evaluation. When CNT(k)=CNT0 does not hold, the CPU 114 returns to step ST4, and receives packet error detection information FCS concerning the zone k from the CPU I/F register 113 and performs processing similar to that described above. When CNT(k)=CNT0 holds, the CPU 114 proceeds to step ST9.

In step ST9, the CPU 114 determines whether or not the count number PEC(k) of packet errors in the zone k is greater than 0. When PEC(k)>0 holds, in step ST10, the CPU 114 determines whether or not the count number PEC(k) is greater than a threshold value TH of the count number of packet errors, for example, 0.1*CNT0, which triggers the switching of a PHY mode.

When PEC(k)>TH holds, in step ST11, the CPU 114 determines whether or not a PHY mode Rate(k) of the zone k is the PHY mode of 53.3 Mbps. Note that, as shown in FIG. 9, there are eight PHY modes of 53.3 Mbps, 80 Mbps, 106.7 Mbps, 160 Mbps, 200 Mbps, 320 Mbps, 400 Mbps, and 480 Mbps. When the PHY mode Rate(k) is not the PHY mode of 53.3 Mbps, in step ST12, the CPU 114 decreases the PHY mode Rate(k) of the zone k by one step, and then proceeds to step ST13.

Note that when PEC(k)>TH does not hold in step ST10 or when the PHY mode Rate(k) the PHY mode of 53.3 Mbps in step ST11, the CPU 114 immediately proceeds to step ST13 because it is not necessary to change the PHY mode Rate(k). In step ST13, the CPU 114 updates the PHY mode Rate(k) of the zone k in the PHY mode table 115, and then ends the process in step ST14.

When PEC(k)>0 does not hold in step ST9, that is, when PEC(k)=0 holds, in step ST15, the CPU 114 determines whether or not the PHY mode Rate(k) of the zone k is the mode of 480 Mbps. When the PHY mode is not the mode of 480 Mbps, in step ST16, the CPU 114 increases the current PHY mode Rate(k) of the zone k by one step. Then, in step ST13, the CPU 114 updates the PHY mode Rate(k) of the zone k, and then ends the process in step ST14.

The processing of steps ST4 to ST14 described above is performed for each k value, that is, each of the zones 0 to 15, and is also performed for each of individual communication partners having different destination IDs if a plurality of communication partners are present.

Furthermore, when no time-dependent interference is present in step ST3 described above, the CPU 114 proceeds to step ST21. In step ST21, the CPU 114 receives packet error detection information FCS concerning a predetermined zone ku being used by myself from the CPU I/F register 113. In step ST22, the CPU 114 increases the count number CNT(ku) of sent and received packets by only one.

Then, in step ST23, the CPU 114 determines whether or not a packet error exists on the basis of the packet error detection information FCS received in step ST21. When a packet error exists, in step ST24, the CPU 114 increases the count number PEC(ku) of packet errors by only one, and then proceeds to step ST25. When no packet errors exist, on the other hand, the CPU 114 immediately proceeds to step ST25.

In in step ST25, the CPU 114 determines whether or not the count number CNT(ku) of sent and received packets in the zone ku has reached the packet count number CNT0. When CNT(ku)=CNT0 does not hold, the CPU 114 returns to step ST21, and receives packet error detection information FCS concerning the zone 0 from the CPU I/F register 113 and performs processing similar to that described above. When CNT(ku)=CNT0 holds, the CPU 114 proceeds to step ST26.

In step ST26, the CPU 114 sets the count number PEC(k) of packet errors in all zones k (k=0 to 15) to be equal to the count number PEC(ku) of packet errors in the zone ku, which is obtained in the manner described above, and then proceeds to step ST9. In the subsequent processing, the CPU 114 sets PHY modes of the individual zones in a manner similar to the process described above, which is performed in a case where time-dependent interference is present. In this manner, when no time-dependent interference is present, the count numbers of packet errors in the individual zones become equal to each other, and therefore the PHY modes in the individual zones are set to the same mode.

Note that in the foregoing description, PHY modes of individual zones are set using packet error detection information FCS concerning a predetermined zone ku being used by myself; however, for example, PHY modes of individual zones may be set using packet error detection information FCS concerning all zones.

Figure 3:
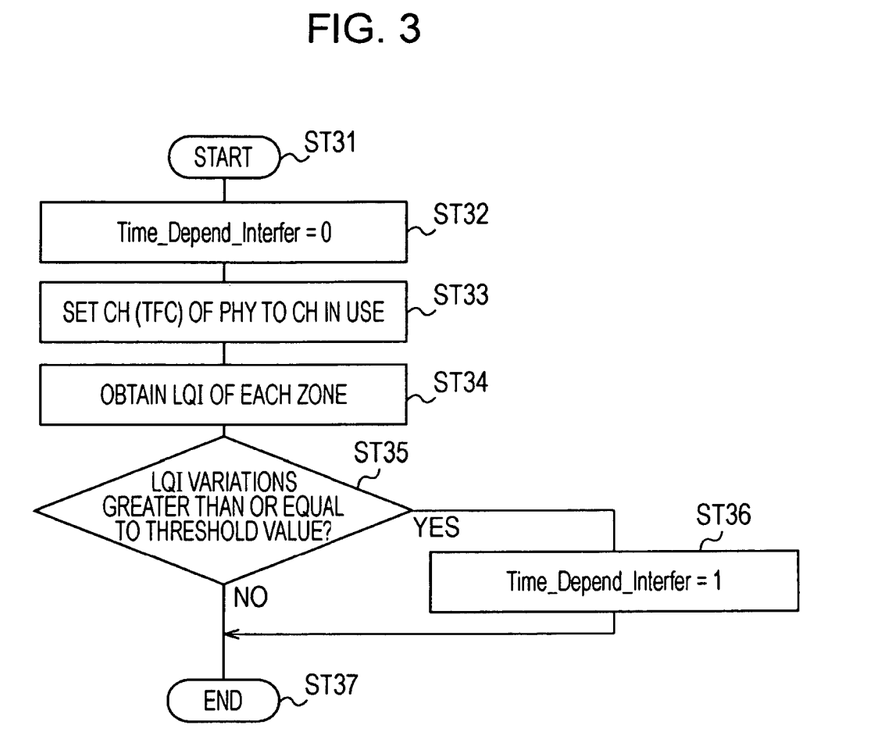
FIG. 3 is a flowchart for explaining an example of a process of determining the presence or absence of time-dependent interference.

Next, an example of a time-dependent interference determination process, which is performed by the CPU 114, will be described with reference to a flowchart of FIG. 3. This process is to perform determination based on whether or not variations of reception quality in each zone exceed a predetermined range.

The CPU 114 starts the process in step ST31, and sets a flag Time_Depend_Interfer relating to time-dependent interference to 0 in step ST32. Here, Time_Depend_Interfer=0 means that no time-dependent interference is present, and Time_Depend_Interfer=1 means that time-dependent interference is present.

Then, in step ST33, the CPU 114 sets a channel (TFC) in the PHY signal processing unit 117 to a channel being used by myself. Then, in step ST34, the CPU 114 obtains reception quality LQI of each zone. Then, in step ST35, the CPU 114 determines whether or not variations of the reception quality in each zone are greater than or equal to a threshold value.

When variations of the reception quality in each zone are greater than or equal to the threshold value, the CPU determines that time-dependent interference is present, and, in step ST36, the CPU 114 sets Time_Depend_Interfer=1. Then, in step ST37, the CPU 114 ends the process. When variations of the reception quality in each zone are not greater than or equal to the threshold value, on the other hand, the CPU 114 determines that no time-dependent interference is present, and, in step ST37, the CPU 114 ends the process with Time_Depend_ Interfer=0 maintained.

Figure 4:
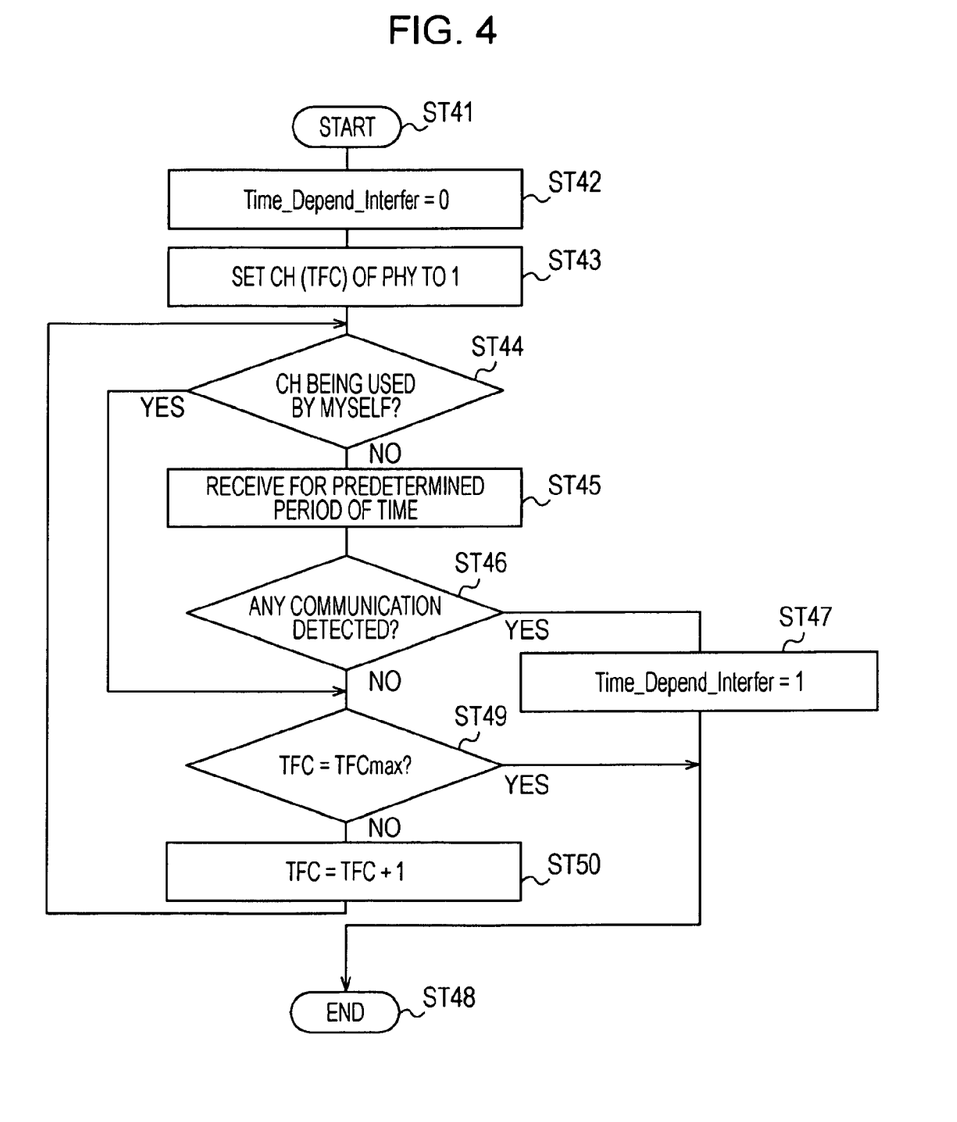
FIG. 4 is a flowchart for explaining another example of a process of determining the presence or absence of time-dependent interference.

Next, another example of a time-dependent interference determination process, which is performed by the CPU 114, will be described with reference to a flowchart of FIG. 4. This process is to perform determination based on whether or not communication is being performed over a channel being not used by myself.

The CPU 114 starts the process in step ST41, and sets a flag Time_Depend_Interfer relating to time-dependent interference to 0 in step ST42. Then, in step ST43, the CPU 114 sets a channel (TFC) in the PHY signal processing unit 117 to 1. Then, in step ST44, the CPU 114 determines whether or not the set channel is a channel being used by myself. When the set channel is not the channel being used by myself, the CPU 114 proceeds to step ST45.

In step ST45, the CPU 114 performs reception using the channel set in step ST43 for a predetermined period of time. Then, in step ST46, the CPU 114 determines whether or not any communication has been detected. When any communication is detected, the CPU 114 proceeds to step ST47. In step ST47, the CPU 114 determines that time-dependent interference is present, and sets Time_Depend_Interfer=1. Then, in step ST48, the CPU 114 ends the process.

When no communication is detected in step ST46, the CPU 114 proceeds to step ST49. The CPU 114 also proceeds to step ST49 when the set channel is the channel being used by myself in step ST44. In step ST49, the CPU 114 determines whether or not the channel is a maximum channel TFCmax (=7). When the channel is the maximum channel, this means that reception has been performed using all the channels except for the channel being used by myself. Thus, the CPU 114 determines that no time-dependent interference is present, and ends the process in step ST48 with Time_Depend_Interfer=0 maintained.

When the channel is not the maximum channel TFCmax in step ST49, on the other hand, in step ST50, the CPU 114 increases the channel number by only one, and sets a next channel. Then, the CPU 114 returns to step ST44, and performs processing similar to that described above.

As described above, according to the communication apparatus 100 shown in FIG. 1, PHY modes (transmission schemes) of individual zones are set on the basis of the communication state of the individual zones, for example, the packet error rate. Therefore, PHY modes with the highest data transfer efficiency can be set for individual zones, and a maximum data transfer rate can be ensured in radio communication with a communication partner to achieve an improvement in throughput.

Figure 5:
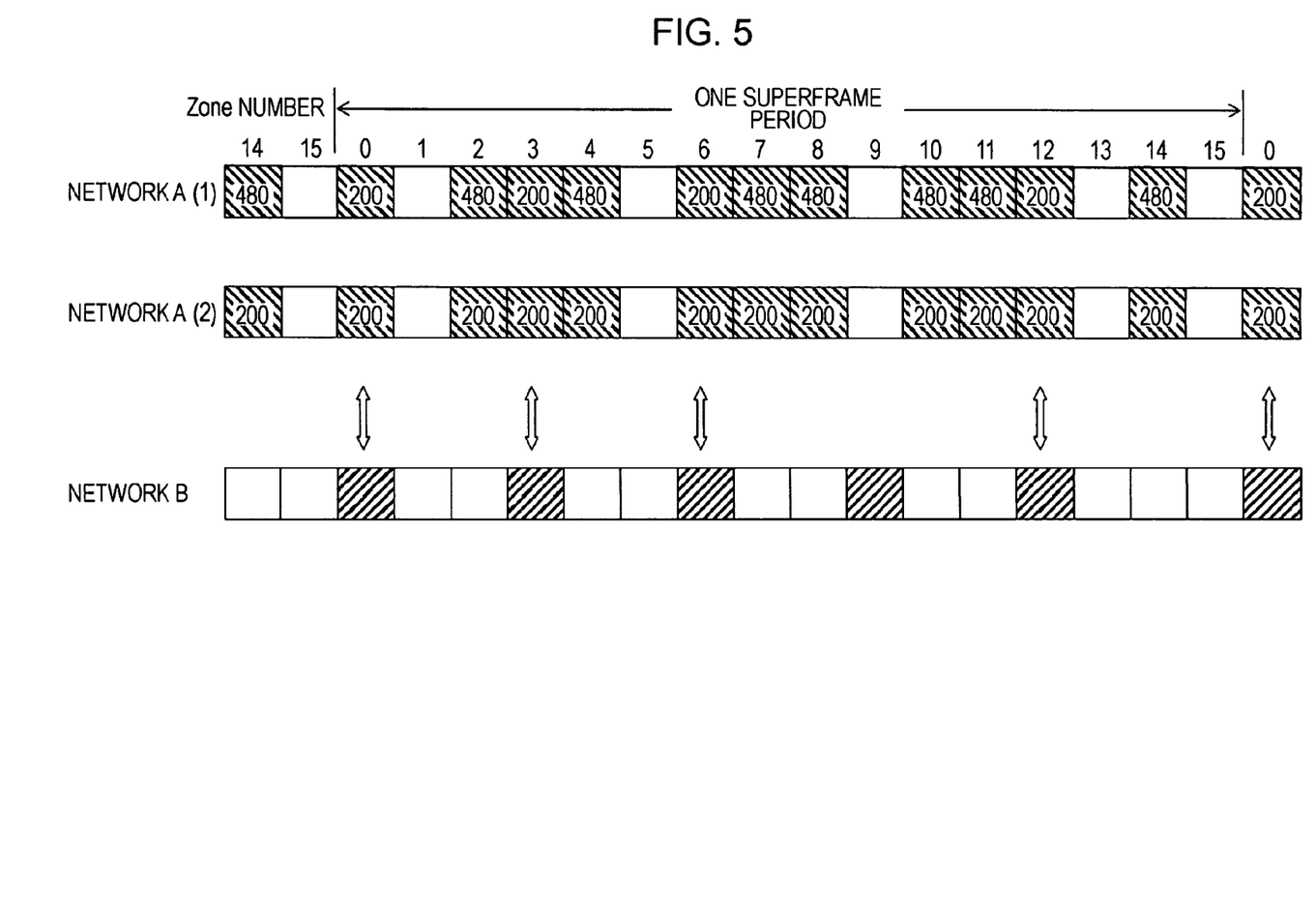
FIG. 5 is a diagram for explaining throughputs of a scheme of the related art and that of the present invention.

For example, a case is considered in which in the networks A and B existing in the manner shown in FIG. 10, as indicated by arrows shown in FIG. 5, interference exists between the networks A and B in four zones out of 16 zones. In this case, in the uniform setting of PHY modes of the related art, as indicated by a network A(2) of FIG. 5, PHY modes of individual zones are uniformly set to those of 200 Mbps, resulting in a data transfer rate of 200 Mbps. In this invention, in contrast, a PHY mode of a zone where interference exists is set to that of 200 Mbps while PHY modes of the remaining zones are set to those of, for example, 480 Mbps, resulting in a data transfer rate of 427 Mbps on average. This yields throughput about twice that of the PHY mode setting scheme of the related art.

In the foregoing embodiment, in the process of setting a PHY mode (see FIG. 2), packet error detection information is used to determine the communication state of individual zones. Instead, transmission line state information may be used to determine the communication state of individual zones. In this case, when the transmission line state is worse than a predetermined state in a state where a predetermined PHY mode is set, the PHY mode may be updated to a PHY mode of a one step lower data transfer rate.

In the foregoing embodiment, furthermore, a time region is divided such that one superframe period is divided by every zone. Alternatively, a time region may be divided by any other division unit, for example, every MAS or every predetermined number of MASs.

Furthermore, the foregoing embodiment is adapted such that this invention is applied to a WUSB communication system. However, it is to be understood that this invention can also be applied to a communication system that can selectively use a plurality of transmission schemes having different data transfer rates and that performs radio communication using a frame structure.

INDUSTRIAL APPLICABILITY

This invention is intended to ensure a maximum data transfer rate to achieve an improvement in throughput, and can be applied to a communication system that performs radio communication using a frame structure, such as a WUSB communication system.

The invention claimed is:

1. A communication apparatus that performs radio communication with another communication apparatus using a superframe having a beacon period and data transmission period, wherein the radio communication is performed by applying repetitions of a predetermined frequency hopping pattern, comprising:
 a time region division unit that divides the superframe into a plurality of time regions;
 a communication state monitoring unit that monitors a communication state in each of the plurality of time regions obtained by the time region division unit;
 a transmission scheme rate setting unit that sets, based on a monitoring result obtained by the communication state monitoring unit for each of the plurality of time regions, a transmission scheme rate to be used in each of the plurality of time regions; and
 a time dependency determining unit that determines whether or not time-dependent interference is present during communication with the other communication apparatus, wherein the time dependency determining unit performs receptions by sequentially changing frequency hopping patterns except for the predetermined frequency hopping pattern, and determines that the time-dependent interference is present when any communication is received using one of the sequentially changed frequency hopping patterns.

2. The communication apparatus according to claim 1, wherein the communication state monitoring unit monitors errors of a packet at least to be sent to or received from the other communication apparatus, and
 the transmission scheme rate setting unit sets the transmission scheme rate according to an error rate of the packet.

3. The communication apparatus according to claim 2, wherein when the error rate of the packet exceeds a predetermined value in a state where a predetermined transmission scheme rate is set, the transmission scheme rate setting unit sets again a transmission scheme rate having a lower data transfer rate than the predetermined transmission scheme rate.

4. The communication apparatus according to claim 1, wherein the communication state monitoring unit monitors a transmission line state with respect to the other communication apparatus, and
 the transmission scheme rate setting unit sets the transmission scheme rate according to the transmission line state.

5. The communication apparatus according to claim 4, wherein when the transmission line state is worse than a predetermined state in a state where a predetermined transmission scheme rate is set, the transmission scheme rate setting unit sets again a transmission scheme rate having a lower data transfer rate than the predetermined transmission scheme rate.

6. The communication apparatus according to claim 1, wherein the other communication apparatus includes a plurality of other communication apparatuses,
 the communication state monitoring unit monitors the communication state for each of the other communication apparatuses, and
 the transmission scheme rate setting unit sets, based on a monitoring result obtained by the communication state monitoring unit, the transmission scheme rate for each of the other communication apparatuses.

7. The communication apparatus according to claim 1, wherein when it is determined at the time dependency determining unit that the time-dependent interference is present,
 the communication state monitoring unit monitors a communication state in each of the plurality of time regions obtained by the time region division unit, and
 the transmission scheme rate setting unit sets, based on a monitoring result obtained by the communication state monitoring unit for each of the plurality of time regions, a transmission scheme rate to be used in each of the plurality of time regions.

8. The communication apparatus according to claim 7, wherein when it is determined at the time dependency determining unit that the time-dependent interference is not present,
 the communication state monitoring unit monitors a communication state in a predetermined time region among the plurality of time regions obtained by the time region division unit, and
 the transmission scheme rate setting unit sets, based on a monitoring result obtained by the communication state monitoring unit for the predetermined time region, a transmission scheme rate to be used in each of the plurality of time regions.

9. The communication apparatus according to claim 7, wherein the time dependency determining unit determines that the time-dependent interference is present when variations of reception quality in each of the plurality of time regions obtained by the time region division unit exceed a predetermined range.

10. A transmission scheme rate setting method in a communication apparatus that performs radio communication with another communication apparatus using a superframe having a beacon period and data transmission period, wherein the radio communication is performed by applying repetitions of a predetermined frequency hopping pattern, comprising:
 a time region division step of dividing the superframe into a plurality of time regions;
 a communication state monitoring step of monitoring a communication state in each of the plurality of time regions obtained in the time region division step;
 a transmission scheme rate setting step of setting, based on a monitoring result obtained in the communication state monitoring step for each of the plurality of time regions, a transmission scheme rate to be used in each of the plurality of time regions; and
 a time dependency determining step of determining whether or not time-dependent interference is present during communication with the other communication apparatus, by performing receptions by sequentially changing frequency hopping patterns except for the predetermined frequency hopping pattern, and determining that the time-dependent interference is present when any communication is received using one of the sequentially changed frequency hopping patterns.

11. A non-transitory computer readable medium, having stored thereon a program for causing a computer to execute a transmission scheme rate setting method in order to set a transmission scheme rate in a communication apparatus that performs radio communication with another communication apparatus using a superframe having a beacon period and data transmission period, wherein the radio communication is performed by applying repetitions of a predetermined frequency hopping pattern, the method comprising:
- a time region division step of dividing the superframe into a plurality of time regions;
- a communication state monitoring step of monitoring a communication state in each of the plurality of time regions obtained in the time region division step;
- a transmission scheme rate setting step of setting, based on a monitoring result obtained in the communication state monitoring step for each of the plurality of time regions, a transmission scheme rate to be used in each of the plurality of time regions; and
- a time dependency determining step of determining whether or not time-dependent interference is present during communication with the other communication apparatus, by performing receptions by sequentially changing frequency hopping patterns except for the predetermined frequency hopping pattern, and determining that the time-dependent interference is present when any communication is received using one of the sequentially changed frequency hopping patterns.

12. A radio communication system including a first communication apparatus on a host side and a second communication apparatus on a device side, wherein the first communication apparatus and the second communication apparatus perform radio communication using a superframe having a beacon period and data transmission period, wherein the radio communication is performed by applying repetitions of a predetermined frequency hopping pattern, wherein the first communication apparatus comprises:
- a time region division unit that divides the superframe into a plurality of time regions;
- a communication state monitoring unit that monitors a communication state in each of the plurality of time regions obtained by the time region division unit;
- a transmission scheme rate setting unit that sets, based on a monitoring result obtained by the communication state monitoring unit for each of the plurality of time regions, a transmission scheme rate to be used in each of the plurality of time regions; and
- a time dependency determining unit that determines whether or not time-dependent interference is present during communication with the other communication apparatus, wherein the time dependency determining unit performs receptions by sequentially changing frequency hopping patterns except for the predetermined frequency hopping pattern, and determines that the time-dependent interference is present when any communication is received using one of the sequentially changed frequency hopping patterns.

* * * * *